(12) United States Patent
Suzuki

(10) Patent No.: US 8,094,398 B2
(45) Date of Patent: Jan. 10, 2012

(54) ARRANGEMENT METHOD OF SERVO PATTERN OF PATTERNED MEDIUM, PATTERNED MEDIUM, AND INFORMATION STORAGE DEVICE

(75) Inventor: Hiroyuki Suzuki, Oume (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/728,004

(22) Filed: Mar. 19, 2010

(65) Prior Publication Data

US 2010/0238586 A1 Sep. 23, 2010

(30) Foreign Application Priority Data

Mar. 19, 2009 (JP) ................................. 2009-069022

(51) Int. Cl.
*G11B 5/09* (2006.01)
*G11B 5/596* (2006.01)

(52) U.S. Cl. .......................... 360/49; 360/48; 360/77.08

(58) Field of Classification Search .................... None
See application file for complete search history.

(56) References Cited

U.S. PATENT DOCUMENTS

2006/0044670 A1 3/2006 Tagami
2006/0109579 A1* 5/2006 Asakura et al. ................. 360/49

FOREIGN PATENT DOCUMENTS

| JP | 2006-066006 A | 3/2006 |
| JP | 2006-147112 | 6/2006 |
| JP | 2006-147112 A | 6/2006 |
| JP | 2010-097640 A | 4/2010 |

OTHER PUBLICATIONS

Information Sheet in one page.
Notice of Reasons for Rejection mailed by Japan Patent Office on Mar. 22, 2011 in the corresponding Japanese patent application No. 2009-069022.

* cited by examiner

*Primary Examiner* — Daniell L Negron
*Assistant Examiner* — Regina N Holder
(74) *Attorney, Agent, or Firm* — Knobbe, Martens, Olson & Bear, LLP

(57) ABSTRACT

According to one embodiment, address information is expanded on a bit map in order to generate original address information which is divided in a direction of the abscissa to form groups. The demodulated values of the original address information are obtained as original intra-group demodulated values. New address information is obtained and an arrangement pattern of bits in the servo area determined based on the new address information on a bit map formed by integrating obtained new address information items of the groups.

12 Claims, 16 Drawing Sheets

| C | | | | Bit map B | | | | A | | | | |
|---|---|---|---|---|---|---|---|---|---|---|---|---|
| (C) | | | | Data value (B) | | | | (A) | | | | |
| i | h | g | <C> | f | e | d | Demodulated value <B> | c | b | a | <A> | Demodulated value (total) |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 1 | 1 |
| 0 | 0 | 0 | 0 | 0 | 0 | 0 | 0 | 0 | 1 | 0 | 2 | 2 |
| 0 | 0 | 0 | 0 | 0 | 0 | 0 | 0 | 0 | 1 | 1 | 3 | 3 |
| 0 | 0 | 0 | 0 | 0 | 0 | 0 | 0 | 1 | 0 | 0 | 4 | 4 |
| 0 | 0 | 0 | 0 | 0 | 0 | 0 | 0 | 1 | 0 | 1 | 5 | 5 |
| 0 | 0 | 0 | 0 | 0 | 0 | 0 | 0 | 1 | 1 | 0 | 6 | 6 |
| 0 | 0 | 0 | 0 | 0 | 0 | 0 | 0 | 1 | 1 | 1 | 7 | 7 |
| 0 | 0 | 0 | 0 | 0 | 0 | 1 | 1 | 0 | 0 | 0 | 0 | 8 |
| 0 | 0 | 0 | 0 | 0 | 0 | 1 | 1 | 0 | 0 | 1 | 1 | 9 |
| 0 | 0 | 0 | 0 | 0 | 0 | 1 | 1 | 0 | 1 | 0 | 2 | 10 |
| 0 | 0 | 0 | 0 | 0 | 0 | 1 | 1 | 0 | 1 | 1 | 3 | 11 |
| 0 | 0 | 0 | 0 | 0 | 0 | 1 | 1 | 1 | 0 | 0 | 4 | 12 |
| 0 | 0 | 0 | 0 | 0 | 0 | 1 | 1 | 1 | 0 | 1 | 5 | 13 |
| 0 | 0 | 0 | 0 | 0 | 0 | 1 | 1 | 1 | 1 | 0 | 6 | 14 |
| 0 | 0 | 0 | 0 | 0 | 0 | 1 | 1 | 1 | 1 | 1 | 7 | 15 |
| 0 | 0 | 0 | 0 | 0 | 1 | 0 | 2 | 0 | 0 | 0 | 0 | 16 |
| 0 | 0 | 0 | 0 | 0 | 1 | 0 | 2 | 0 | 0 | 1 | 1 | 17 |
| 0 | 0 | 0 | 0 | 0 | 1 | 0 | 2 | 0 | 1 | 0 | 2 | 18 |
| 0 | 0 | 0 | 0 | 0 | 1 | 0 | 2 | 0 | 1 | 1 | 3 | 19 |
| 0 | 0 | 0 | 0 | 0 | 1 | 0 | 2 | 1 | 0 | 0 | 4 | 20 |
| 0 | 0 | 0 | 0 | 0 | 1 | 0 | 2 | 1 | 0 | 1 | 5 | 21 |
| 0 | 0 | 0 | 0 | 0 | 1 | 0 | 2 | 1 | 1 | 0 | 6 | 22 |
| 0 | 0 | 0 | 0 | 0 | 1 | 0 | 2 | 1 | 1 | 1 | 7 | 23 |
| 0 | 0 | 0 | 0 | 0 | 1 | 1 | 3 | 0 | 0 | 0 | 0 | 24 |
| 0 | 0 | 0 | 0 | 0 | 1 | 1 | 3 | 0 | 0 | 1 | 1 | 25 |
| 0 | 0 | 0 | 0 | 0 | 1 | 1 | 3 | 0 | 1 | 0 | 2 | 26 |
| 0 | 0 | 0 | 0 | 0 | 1 | 1 | 3 | 0 | 1 | 1 | 3 | 27 |
| 0 | 0 | 0 | 0 | 0 | 1 | 1 | 3 | 1 | 0 | 0 | 4 | 28 |
| 0 | 0 | 0 | 0 | 0 | 1 | 1 | 3 | 1 | 0 | 1 | 5 | 29 |
| 0 | 0 | 0 | 0 | 0 | 1 | 1 | 3 | 1 | 1 | 0 | 6 | 30 |
| 0 | 0 | 0 | 0 | 0 | 1 | 1 | 3 | 1 | 1 | 1 | 7 | 31 |

| C1 | | | Bit map B1 | | | A1 | | | |
| --- | --- | --- | --- | --- | --- | --- | --- | --- | --- |
| (C) | | | Data value (B) | | | (A) | | | |
| i | h | g | f | e | d | c | b | a | Cylinder |
| 0 | 0 | 0 | 0 | 0 | 0 | 0 | 0 | 0 | 0 |
| 0 | 0 | 1 | 1 | 1 | 1 | 0 | 0 | 1 | 1 |
| 0 | 1 | 0 | 1 | 1 | 0 | 0 | 1 | 0 | 2 |
| 0 | 1 | 1 | 1 | 0 | 1 | 0 | 1 | 1 | 3 |
| 1 | 0 | 0 | 1 | 0 | 0 | 1 | 0 | 0 | 4 |
| 1 | 0 | 1 | 0 | 1 | 1 | 1 | 0 | 1 | 5 |
| 1 | 1 | 0 | 0 | 1 | 0 | 1 | 1 | 0 | 6 |
| 1 | 1 | 1 | 0 | 1 | 1 | 1 | 1 | 1 | 7 |
| 0 | 0 | 0 | 0 | 0 | 1 | 0 | 0 | 0 | 8 |
| 0 | 0 | 1 | 0 | 1 | 0 | 0 | 0 | 1 | 9 |
| 0 | 1 | 0 | 0 | 1 | 0 | 0 | 1 | 0 | 10 |
| 0 | 1 | 1 | 1 | 0 | 0 | 0 | 1 | 1 | 11 |
| 1 | 0 | 0 | 1 | 0 | 1 | 1 | 0 | 0 | 12 |
| 1 | 0 | 1 | 1 | 1 | 0 | 1 | 0 | 1 | 13 |
| 1 | 1 | 0 | 1 | 1 | 1 | 1 | 1 | 0 | 14 |
| 1 | 1 | 1 | 0 | 0 | 0 | 1 | 1 | 1 | 15 |
| 0 | 0 | 0 | 0 | 1 | 0 | 0 | 0 | 0 | 16 |
| 0 | 0 | 1 | 0 | 1 | 1 | 0 | 0 | 1 | 17 |
| 0 | 1 | 0 | 1 | 0 | 0 | 0 | 1 | 0 | 18 |
| 0 | 1 | 1 | 1 | 0 | 1 | 0 | 1 | 1 | 19 |
| 1 | 0 | 0 | 1 | 1 | 0 | 1 | 0 | 0 | 20 |
| 1 | 0 | 1 | 1 | 1 | 1 | 1 | 0 | 1 | 21 |
| 1 | 1 | 0 | 0 | 0 | 0 | 1 | 1 | 0 | 22 |
| 1 | 1 | 1 | 0 | 0 | 1 | 1 | 1 | 1 | 23 |
| 0 | 0 | 0 | 0 | 1 | 1 | 0 | 0 | 0 | 24 |
| 0 | 0 | 1 | 1 | 0 | 0 | 0 | 0 | 1 | 25 |
| 0 | 1 | 0 | 1 | 0 | 1 | 0 | 1 | 0 | 26 |
| 0 | 1 | 1 | 1 | 1 | 0 | 0 | 1 | 1 | 27 |
| 1 | 0 | 0 | 1 | 1 | 1 | 1 | 0 | 0 | 28 |
| 1 | 0 | 1 | 0 | 0 | 0 | 1 | 0 | 1 | 29 |
| 1 | 1 | 0 | 0 | 0 | 1 | 1 | 1 | 0 | 30 |
| 1 | 1 | 1 | 0 | 1 | 0 | 1 | 1 | 1 | 31 |

MSB                  LSB

| C2 | | | Bit map B2 | | | A2 | | | |
|---|---|---|---|---|---|---|---|---|---|
| i | h | g | f | e | d | c | b | a | Cylinder |
| 0 | 0 | 0 | 0 | 0 | 0 | 0 | 0 | 0 | 0 |
| 0 | 0 | 1 | 0 | 0 | 1 | 0 | 0 | 1 | 1 |
| 0 | 1 | 0 | 0 | 1 | 0 | 0 | 1 | 0 | 2 |
| 0 | 1 | 1 | 0 | 1 | 1 | 0 | 1 | 1 | 3 |
| 1 | 0 | 0 | 1 | 0 | 0 | 1 | 0 | 0 | 4 |
| 1 | 0 | 1 | 1 | 0 | 1 | 1 | 0 | 1 | 5 |
| 1 | 1 | 0 | 1 | 1 | 0 | 1 | 1 | 0 | 6 |
| 1 | 1 | 1 | 1 | 1 | 1 | 1 | 1 | 1 | 7 |
| 0 | 0 | 1 | 0 | 0 | 1 | 0 | 0 | 0 | 8 |
| 0 | 1 | 0 | 0 | 1 | 0 | 0 | 0 | 1 | 9 |
| 0 | 1 | 1 | 0 | 1 | 1 | 0 | 1 | 0 | 10 |
| 1 | 0 | 0 | 1 | 0 | 0 | 0 | 1 | 1 | 11 |
| 1 | 0 | 1 | 1 | 0 | 1 | 1 | 0 | 0 | 12 |
| 1 | 1 | 0 | 1 | 1 | 0 | 1 | 0 | 1 | 13 |
| 1 | 1 | 1 | 1 | 1 | 1 | 1 | 1 | 0 | 14 |
| 0 | 0 | 0 | 0 | 0 | 0 | 1 | 1 | 1 | 15 |
| 0 | 1 | 0 | 0 | 1 | 0 | 0 | 0 | 0 | 16 |
| 0 | 1 | 1 | 0 | 1 | 1 | 0 | 0 | 1 | 17 |
| 1 | 0 | 0 | 1 | 0 | 0 | 0 | 1 | 0 | 18 |
| 1 | 0 | 1 | 1 | 0 | 1 | 0 | 1 | 1 | 19 |
| 1 | 1 | 0 | 1 | 1 | 0 | 1 | 0 | 0 | 20 |
| 1 | 1 | 1 | 1 | 1 | 1 | 1 | 0 | 1 | 21 |
| 0 | 0 | 0 | 0 | 0 | 0 | 1 | 1 | 0 | 22 |
| 0 | 0 | 1 | 0 | 0 | 1 | 1 | 1 | 1 | 23 |
| 0 | 1 | 1 | 0 | 1 | 1 | 0 | 0 | 0 | 24 |
| 1 | 0 | 0 | 1 | 0 | 0 | 0 | 0 | 1 | 25 |
| 1 | 0 | 1 | 1 | 0 | 1 | 0 | 1 | 0 | 26 |
| 1 | 1 | 0 | 1 | 1 | 0 | 0 | 1 | 1 | 27 |
| 1 | 1 | 1 | 1 | 1 | 1 | 1 | 0 | 0 | 28 |
| 0 | 0 | 0 | 0 | 0 | 0 | 1 | 0 | 1 | 29 |
| 0 | 0 | 1 | 0 | 0 | 1 | 1 | 1 | 0 | 30 |
| 0 | 1 | 0 | 0 | 1 | 0 | 1 | 1 | 1 | 31 |

MSB        LSB

→ Radial direction

F I G. 7

| | | C3 | | | Bit map B3 | | | | A3 | | Cylinder | Demodulated value (total) |
|---|---|---|---|---|---|---|---|---|---|---|---|---|
| | i | h | g | f | e | d | c | b | a | | | |
| CP | 0 | 0 | 0 | 0 | 0 | 0 | 0 | 0 | 0 | AP | 0 | 0 |
| | 0 | 0 | 0 | 0 | 0 | 0 | 0 | 0 | 1 | | 1 | 1 |
| | 0 | 0 | 0 | 0 | 0 | 0 | 0 | 1 | 0 | | 2 | 2 |
| | 0 | 0 | 0 | 0 | 0 | 0 | 0 | 1 | 1 | | 3 | 3 |
| | 0 | 0 | 0 | 0 | 0 | 0 | 1 | 0 | 0 | | 4 | 4 |
| | 0 | 0 | 0 | 0 | 0 | 0 | 1 | 0 | 1 | | 5 | 5 |
| | 0 | 0 | 0 | 0 | 0 | 0 | 1 | 1 | 0 | | 6 | 6 |
| | 0 | 0 | 0 | 0 | 0 | 0 | 1 | 1 | 1 | | 7 | 7 |
| | 0 | 0 | 0 | 0 | 0 | 1 | 0 | 0 | 0 | AQ | 8 | 8 |
| | 0 | 0 | 0 | 0 | 0 | 1 | 0 | 0 | 1 | | 9 | 9 |
| | 0 | 0 | 0 | 0 | 0 | 1 | 0 | 1 | 0 | | 10 | 10 |
| | 0 | 0 | 0 | 0 | 0 | 1 | 0 | 1 | 1 | BQ | 11 | 11 |
| | 0 | 0 | 0 | 0 | 0 | 1 | 1 | 0 | 0 | | 12 | 12 |
| | 0 | 0 | 0 | 0 | 0 | 1 | 1 | 0 | 1 | | 13 | 13 |
| | 0 | 0 | 0 | 0 | 0 | 1 | 1 | 1 | 0 | | 14 | 14 |
| CQ | 0 | 0 | 0 | 0 | 0 | 1 | 1 | 1 | 1 | | 15 | 15 |
| | 0 | 0 | 0 | 0 | 1 | 0 | 0 | 0 | 0 | | 16 | 16 |
| | 0 | 0 | 0 | 0 | 1 | 0 | 0 | 0 | 1 | | 17 | 17 |
| | 0 | 0 | 0 | 0 | 1 | 0 | 0 | 1 | 0 | AR | 18 | 18 |
| | 0 | 0 | 0 | 0 | 1 | 0 | 0 | 1 | 1 | | 19 | 19 |
| | 0 | 0 | 0 | 0 | 1 | 0 | 1 | 0 | 0 | | 20 | 20 |
| | 0 | 0 | 0 | 0 | 1 | 0 | 1 | 0 | 1 | | 21 | 21 |
| | 0 | 0 | 0 | 0 | 1 | 0 | 1 | 1 | 0 | | 22 | 22 |
| CR | 0 | 0 | 0 | 0 | 1 | 0 | 1 | 1 | 1 | | 23 | 23 |
| | 0 | 0 | 0 | 0 | 1 | 1 | 0 | 0 | 0 | | 24 | 24 |
| | 0 | 0 | 0 | 0 | 1 | 1 | 0 | 0 | 1 | | 25 | 25 |
| | 0 | 0 | 0 | 0 | 1 | 1 | 0 | 1 | 0 | AT | 26 | 26 |
| | 0 | 0 | 0 | 0 | 1 | 1 | 0 | 1 | 1 | | 27 | 27 |
| | 0 | 0 | 0 | 0 | 1 | 1 | 1 | 0 | 0 | | 28 | 28 |
| | 0 | 0 | 0 | 0 | 1 | 1 | 1 | 0 | 1 | | 29 | 29 |
| | 0 | 0 | 0 | 0 | 1 | 1 | 1 | 1 | 0 | | 30 | 30 |
| | 0 | 0 | 0 | 0 | 1 | 1 | 1 | 1 | 1 | | 31 | 31 |

|   | C3 | | | Bit map B3 | | | A3 | | | Cylinder |
|---|---|---|---|---|---|---|---|---|---|---|
|   | i | h | g | f | e | d | c | b | a | |
| P | 0 | 0 | 0 | 0 | 0 | 0 | 0 | 0 | 0 | 0 |
|   | 0 | 0 | 0 | 0 | 0 | 0 | 0 | 0 | 1 | 1 |
|   | 0 | 0 | 0 | 0 | 0 | 0 | 0 | 1 | 0 | 2 |
|   | 0 | 0 | 0 | 0 | 0 | 0 | 0 | 1 | 1 | 3 |
|   | 0 | 0 | 0 | 0 | 0 | 0 | 1 | 0 | 0 | 4 |
|   | 0 | 0 | 0 | 0 | 0 | 0 | 1 | 0 | 1 | 5 |
|   | 0 | 0 | 0 | 0 | 0 | 0 | 1 | 1 | 0 | 6 |
|   | 0 | 0 | 0 | 0 | 0 | 0 | 1 | 1 | 1 | 7 |
| Q | 0 | 0 | 1 | 0 | 0 | 1 | 0 | 0 | 0 | 8 |
|   | 0 | 0 | 1 | 0 | 0 | 1 | 0 | 0 | 0 | 9 |
|   | 0 | 0 | 1 | 0 | 1 | 1 | 0 | 0 | 0 | 10 |
|   | 0 | 0 | 1 | 0 | 1 | 1 | 0 | 0 | 0 | 11 |
|   | 0 | 0 | 1 | 1 | 0 | 1 | 0 | 0 | 0 | 12 |
|   | 0 | 0 | 1 | 1 | 0 | 1 | 0 | 0 | 0 | 13 |
|   | 0 | 0 | 1 | 1 | 1 | 1 | 0 | 0 | 0 | 14 |
|   | 0 | 0 | 1 | 1 | 1 | 1 | 0 | 0 | 0 | 15 |
| R | 0 | 0 | 1 | 0 | 0 | 0 | 0 | 1 | 0 | 16 |
|   | 0 | 0 | 1 | 0 | 0 | 0 | 0 | 1 | 0 | 17 |
|   | 0 | 1 | 1 | 0 | 0 | 0 | 0 | 1 | 0 | 18 |
|   | 0 | 1 | 1 | 0 | 0 | 0 | 0 | 1 | 0 | 19 |
|   | 1 | 0 | 1 | 0 | 0 | 0 | 0 | 1 | 0 | 20 |
|   | 1 | 0 | 1 | 0 | 0 | 0 | 0 | 1 | 0 | 21 |
|   | 1 | 1 | 1 | 0 | 0 | 0 | 0 | 1 | 0 | 22 |
|   | 1 | 1 | 1 | 0 | 0 | 0 | 0 | 1 | 0 | 23 |
| T | 0 | 0 | 0 | 0 | 1 | 1 | 0 | 0 | 0 | 24 |
|   | 0 | 0 | 0 | 0 | 1 | 1 | 0 | 0 | 1 | 25 |
|   | 0 | 0 | 0 | 0 | 1 | 1 | 0 | 1 | 0 | 26 |
|   | 0 | 0 | 0 | 0 | 1 | 1 | 0 | 1 | 1 | 27 |
|   | 0 | 0 | 0 | 0 | 1 | 1 | 1 | 0 | 0 | 28 |
|   | 0 | 0 | 0 | 0 | 1 | 1 | 1 | 0 | 1 | 29 |
|   | 0 | 0 | 0 | 0 | 1 | 1 | 1 | 1 | 0 | 30 |
|   | 0 | 0 | 0 | 0 | 1 | 1 | 1 | 1 | 1 | 31 |

MSB                                                 LSB

F I G. 9B

|   | Segment order flag | C | B | A |
|---|---|---|---|---|
| p | C/B/A | CP | BP | AP |
| q | A/C/B | AQ | CQ | BQ |
| r | B/A/C | BR | AR | CR |
| t | C/B/A | CT | BT | AT |
↑ RS (under B column) ↑ RS (under A column)
F I G. 10A
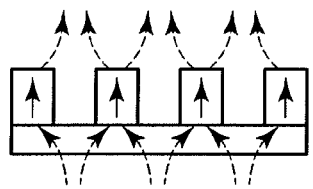
F I G. 10B
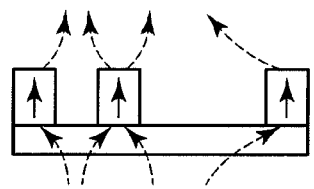
F I G. 10C
|   | C | B | Segment order flag | A |
|---|---|---|---|---|
| p | CP | BP | C/B/A | AP |
| q | AQ | CQ | A/C/B | BQ |
| r | BR | AR | B/A/C | CR |
| t | CT | BT | C/B/A | AT |
F I G. 10D
|   |   | C | Additional info. | B | A |
|---|---|---|---|---|---|
| p | C/B/A | CP |   | BP | AP |
| q | A/C/B | AQ |   | CQ | BQ |
| r | B/A/C | BR |   | AR | CR |
| t | C/B/A | CT |   | BT | AT |
F I G. 10E

FIG. 11A

| C | | | Bit map B | | | A | | | |
|---|---|---|---|---|---|---|---|---|---|
| i | h | g | f | e | d | c | b | a | Cylinder |
| 0 | 0 | 0 | 0 | 0 | 0 | 0 | 0 | 0 | 0 |
| 0 | 0 | 0 | 0 | 0 | 0 | 0 | 1 | 0 | 1 |
| 0 | 0 | 0 | 0 | 0 | 1 | 0 | 0 | 0 | 2 |
| 0 | 0 | 0 | 0 | 1 | 1 | 0 | 0 | 0 | 3 |
| 0 | 0 | 1 | 0 | 0 | 0 | 0 | 0 | 0 | 4 |
| 0 | 1 | 0 | 1 | 0 | 0 | 0 | 0 | 0 | 5 |
| 1 | 1 | 0 | 0 | 0 | 0 | 0 | 0 | 0 | 6 |
| 1 | 1 | 0 | 0 | 0 | 0 | 0 | 0 | 1 | 7 |
| 0 | 0 | 0 | 0 | 0 | 0 | 1 | 0 | 0 | 8 |
| 0 | 0 | 0 | 0 | 0 | 1 | 0 | 0 | 1 | 9 |
| 0 | 0 | 0 | 0 | 1 | 0 | 1 | 0 | 0 | 10 |
| 0 | 0 | 0 | 1 | 0 | 1 | 1 | 0 | 0 | 11 |
| 0 | 0 | 1 | 1 | 0 | 0 | 0 | 0 | 0 | 12 |
| 0 | 1 | 1 | 0 | 1 | 0 | 0 | 0 | 0 | 13 |
| 1 | 1 | 1 | 0 | 0 | 0 | 0 | 0 | 0 | 14 |
| 1 | 1 | 1 | 0 | 0 | 0 | 0 | 0 | 1 | 15 |
| 0 | 0 | 0 | 0 | 0 | 0 | 1 | 0 | 0 | 16 |
| 1 | 0 | 0 | 0 | 0 | 1 | 0 | 0 | 0 | 17 |
| 0 | 0 | 0 | 0 | 1 | 0 | 0 | 1 | 0 | 18 |
| 0 | 0 | 0 | 1 | 0 | 0 | 1 | 1 | 0 | 19 |
| 0 | 0 | 1 | 0 | 1 | 0 | 0 | 0 | 0 | 20 |
| 0 | 1 | 0 | 1 | 0 | 1 | 0 | 0 | 0 | 21 |
| 1 | 1 | 1 | 1 | 0 | 0 | 0 | 0 | 0 | 22 |
| 0 | 1 | 1 | 1 | 0 | 0 | 0 | 0 | 1 | 23 |
| 0 | 0 | 0 | 0 | 0 | 0 | 0 | 1 | 1 | 24 |
| 0 | 1 | 0 | 0 | 0 | 0 | 1 | 1 | 0 | 25 |
| 0 | 0 | 0 | 0 | 0 | 1 | 1 | 0 | 1 | 26 |
| 0 | 0 | 0 | 0 | 1 | 1 | 0 | 1 | 1 | 27 |
| 0 | 0 | 0 | 1 | 1 | 1 | 0 | 0 | 0 | 28 |
| 0 | 0 | 1 | 1 | 1 | 0 | 1 | 0 | 0 | 29 |
| 0 | 1 | 1 | 1 | 1 | 0 | 0 | 0 | 0 | 30 |
| 1 | 1 | 1 | 1 | 1 | 0 | 0 | 0 | 0 | 31 |

F I G. 11B

ARRANGEMENT METHOD OF SERVO PATTERN OF PATTERNED MEDIUM, PATTERNED MEDIUM, AND INFORMATION STORAGE DEVICE

CROSS-REFERENCE TO RELATED APPLICATIONS

This application is based upon and claims the benefit of priority from Japanese Patent Application No. 2009-069022, filed Mar. 19, 2009, the entire contents of which are incorporated herein by reference.

BACKGROUND

1. Field

One embodiment of the invention relates to an arrangement method of a servo pattern of a patterned medium, a patterned medium, and an information storage device.

2. Description of the Related Art

Heretofore, a magnetic disk medium of a hard disk or the like is constituted of a continuous film medium formed of granular magnetic grains with a grain size of 10 nm or less, and one bit is constituted of several tens of magnetic grains. Concomitant with the increase in the recording density of a recording medium in recent years, further micronization of magnetic grains is advanced. However, when the volume of an individual magnetic grain is reduced by the micronization, the stability of the magnetization state is reduced, and hence there arises a problem that the recording medium is deteriorated by heat fluctuation.

Thus, attention is paid not to granular magnetic grains, but to a patterned medium in which one bit is constituted of one dot of a record single-domain film. In a vertical magnetic storage medium used as the patterned medium, isolated magnetic dots are formed on the disk medium in the track direction, and an information unit (bit) is recorded by the magnetic dot, and the medium is called a bit-patterned medium (BPM). In the BPM, there are a data area configured to record data, and servo pattern area configured to record servo information.

In a magnetic disk device in which such a pattern-processed BPM is used, the direction of magnetization of a dot (data bit) for recording data changes in accordance with the value of data in the data area, whereas the servo information is embedded in advance in an area (servo pattern area) in which single magnetic domains are formed. The technique of the patterned medium for embedding and forming in advance the servo information as a pattern including unevenness of a magnetic layer is disclosed in Jpn. Pat. Appln. KOKAI Publication No. 2006-147112. In this case, the magnetization state of the servo pattern area for storing servo information is normally one of upward direction in which magnetization is directed to the surface side of the medium, and oppositely downward direction.

In such a servo pattern area, there are an address part for storing cylinder information and sector information, and position part. The area (although indicative of a volume, hereinafter simply referred to as an area) of a dot of the position part is close to the area of a dot in the data area. On the other hand, regarding the area of a dot in the address part, if the data length is made large in order to secure reliability, although the pattern is divided in the radial direction in the lower-order bits, the pattern is not divided in the radial direction in the higher-order bits. This is because when the data length is large, in the higher-order bits, there is a series of "1", hence the number of dots each expressing "1" becomes large, and the dots form a group to make the area larger, whereas in the lower-order bits, "1" and "0" frequently change, thus the dots are dispersed, and hence the area does not become large.

In the servo pattern area, all the bit magnetization states are in the same direction, and hence magnetic fluxes generated from adjacent bits strike against each other. Further, when the dot area is small, even a single magnetic domain is magnetically stable by virtue of the high coercive force (Hc). When the dot area is large, in the record single-domain film, the coercive force (Hc) lowers to make the state magnetically unstable, and a phenomenon in which part of the magnetization is inverted is caused. When once the magnetization of the bits in the servo pattern area is inverted, this inversion is propagated, thereby destroying servo information in a plurality of tracks.

In servo signals recorded as the dots in the servo pattern area, all the bit magnetization states are set in the same direction in the recording, and the magnetization once recorded is not recorded again. As a result of this, if a phenomenon in which part of the magnetization is inverted is caused at a part of the servo pattern area in which the dot area is large, there has been a problem that the track positioning accuracy of the magnetic head is deteriorated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an explanatory view showing the bit map for 9 bits/32 cylinders shown in FIG. 2B by dividing the bit map into three bit maps of first, second, and third bit maps each for 3 bits/32 cylinders.

FIG. 4 shows views showing the three bit maps of the first, second, and third bit maps each for 3 bits/32 cylinders of the first example.

FIG. 5A is a view showing a bit map for 9 bits/32 cylinders formed by putting the three bit maps of the first, second, and third bit maps shown in FIG. 4 together.

FIG. 6 shows views showing the three bit maps of the first, second, and third bit maps each for 3 bits/32 cylinders of the second example.

FIG. 7 is a view showing a bit map for 9 bits/32 cylinders formed by putting the three bit maps of the first, second, and third bit maps shown in FIG. 6 together.

FIG. 8A is a view showing a bit map showing a state where the bit map for 9 bits/32 cylinders shown in FIG. 2B is divided into three bit maps of first, second, and third bit maps, and four groups each constituted of eight cylinders.

FIG. 8B is an explanatory view for explaining a state where data in the groups are exchanged by dividing the bit map shown in FIG. 8A into three bit maps of first, second, and third bit maps.

FIG. 9A shows views showing three bit maps of first, second, and third bit maps formed by the exchange of data in the groups shown in FIG. 8B.

FIG. 9B is a view showing a bit map for 9 bits/32 cylinders of a third example formed by putting the three bit maps of the first, second, and third bit maps shown in FIG. 9A together.

FIG. 10A is an explanatory view showing a relationship between a segment order flag to be added to an address part of a servo pattern area, and cylinder value information when the third example is implemented.

FIG. 10B is a partially enlarged cross-sectional view showing an influence of a magnetic field on a magnetic dot in an address part of an ordinary servo pattern area.

FIG. 10C is a partially enlarged cross-sectional view showing an influence of a magnetic field on a magnetic dot in an address part when a redundant interval is provided in an address part of a servo pattern area.

FIG. 10D is an explanatory view showing a relationship between a segment order flag and cylinder value information when the position of the segment order flag shown in FIG. 10A is changed.

FIG. 10E is an explanatory view showing a relationship between a segment order flag, cylinder value information, and additional information when additional information is further added to the address part of the servo pattern area shown in FIG. 10A.

FIG. 11A is an explanatory view for explaining a state where data in each cylinder is shifted by one bit at a time in sequence in the bit map shown in FIG. 2B.

FIG. 11B is a view showing a bit map for 9 bits/32 cylinders of a fourth example formed by the shift method shown in FIG. 11A.

DETAILED DESCRIPTION

Various embodiments according to the invention will be described hereinafter with reference to the accompanying drawings. In general, according to one embodiment of the invention, an arrangement method of a servo pattern of a bit-patterned storage medium including a servo area and a data area, the method comprises expanding an address information on a bit map having an abscissa corresponding to a circumferential direction of the storage medium and an ordinate corresponding to a radial direction of the storage medium to generate an original address information; dividing the original address information into groups, each group extending along the ordinate; obtaining demodulated values of the original address information for each group as original intra-group demodulated values; setting, with respect to a lowest order group, the original address information and the original intra-group demodulated value based on the original address information as a new intra-group demodulated value; obtaining a new address information of a certain group in such a manner that a result of an operation of a new intra-group demodulated value of a group lower than the certain group by one order and a new intra-group demodulated value based on the new address information of the certain group becomes an original intra-group demodulated value of the certain group; and determining an arrangement pattern of bits in the servo area based on the new address information.

An embodiment of an arrangement method of a servo pattern of a patterned medium and an embodiment of an information storage device will be described below in detail on the basis of specific examples by using the accompanying drawings. First, the configuration of a hard disk device which is an information storage device will be described with reference to FIG. 1A, and then the configuration of a servo pattern area and magnetization inversion in the servo pattern area will be described with reference to FIGS. 1B to 1D.

Figure 1A:
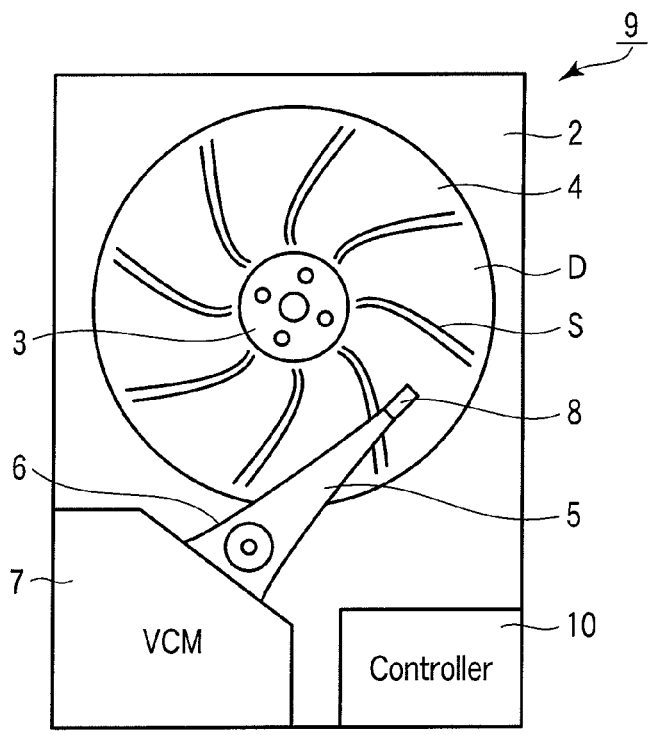
FIG. 1A is a plan view showing the schematic configuration of a hard disk device according to an embodiment of the invention, which incorporating a magnetic disk provided with a servo pattern area and data area.

FIG. 1A shows the schematic configuration of the hard disk device 9 incorporating a magnetic disk 4. The magnetic disk 4 is a bit-patterned magnetic storage medium for vertical recording, and includes a data area D for storing data, and servo pattern area S for storing servo information including track data and sector data. In FIG. 1A, positions of the data area D and servo pattern area S on the magnetic disk 4 are shown.

The magnetic disk 4 is attached to a spindle motor 3 provided at a position offset from the central part on a base part 2 serving as a housing of the hard disk device 9 toward one side, and is rotated by the spindle motor 3. A plurality of magnetic disks 4 may provided on the spindle motor 3 in some cases. At a position offset from the central part on the base part 2 of the hard disk device 9 toward the other side, a swing arm 5 provided with a head (not shown) for accessing a track of the magnetic disk 4, and carrying out read/write of data is arranged. The head is provided on a slider 8, and the slider 8 is attached to a distal end part of the swing arm 5. The swing arm 5 swings around a pivot 6 over the magnetic disk 4.

On the opposite side of the swing arm 5 with respect to the pivot 6, a voice coil motor (VCM) 7 for swinging the swing arm 5 is provided. Control of rotation drive (positioning control) of the swing arm 5 carried out by the voice coil motor 7, and control of data write to the magnetic disk 4 carried out by the head provided on the slider 8 are performed by a controller 10. The controller 10 has an input-output terminal (not shown) configured to exchange information with external apparatuses. Further, the controller 10 has a storage section (not shown) in which a rule for restoring servo information of the embodiment read from the servo pattern area S to correct servo information is stored.

Figure 1B:
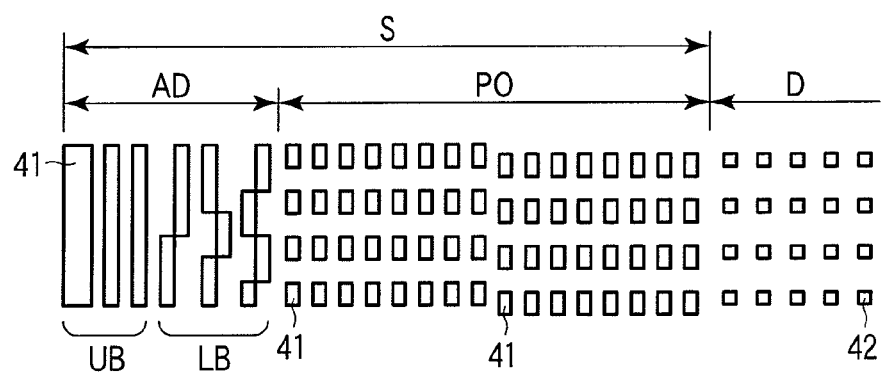
FIG. 1B is a partially enlarged plan view showing an example of a pattern of magnetic dots of a servo pattern area and data area shown in FIG. 1A.

FIG. 1B shows the servo pattern area S and data area D shown in FIG. 1A by partially enlarging the areas S and D. The servo pattern area S includes an address part AD storing cylinder information and sector information, and position part PO. The servo pattern area S and data area D include isolated magnetic dots 41 and 42, respectively. The magnetic dots 41 of the servo pattern area S form a pattern, and magnetization directions (orientation of magnetization in the vertical direction) of the magnetic dots 41 are all the same. The pattern of the magnetic dots 41 shown in FIG. 1B shows a conventional example, and is not an example of the embodiment of the invention. The magnetic dots 42 in the data area D stores data, and magnetization directions of the magnetic dots 42 differ from each other depending on the data.

An area of the dots 41 in the position part PO is close to an area of the dots 42 in the data area D. On the other hand, in the pattern of the conventional example in the address part AD, the data length is made longer in the area of the dots 41 in order to secure reliability, and hence although the pattern is divided in the radial direction in the lower-order bits LB, the pattern is not divided in the radial direction in the higher-order bits UB. This is because when the data length is long, although there is a series of "1" in the higher-order bits, "1" and "0" frequently change in the lower-order bits. As a result of this, the area of the magnetic dots 41 in the higher-order bits UB is larger than that of the magnetic dots 41 in the lower-order bits LB.

In the servo pattern area S, magnetization states of all the bits 41 are in the same direction, and hence magnetic fluxes generated from adjacent bits strike against each other. Further, when the dot area is small, even a single magnetic domain is magnetically stable by virtue of the high coercive force (Hc). When the dot area is large, in the record single-domain film, the coercive force (Hc) lowers to make the state magnetically unstable, and a phenomenon in which part of the magnetization is inverted is caused. This will be described below by using FIGS. 10 and 1D.

Figure 1C:
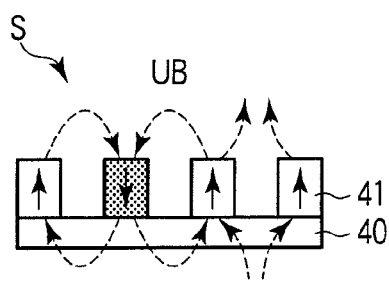
FIG. 1C is a partially enlarged cross-sectional view showing a state where magnetic inversion is caused in part of a pattern of magnetic dots in the higher-order bits of an address part in a servo pattern area shown in FIG. 1B.
Figure 1D:
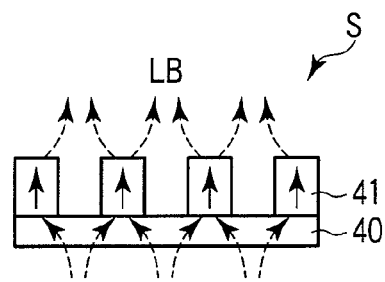
FIG. 1D is a partially enlarged cross-sectional view showing a normal state where no magnetic inversion is caused in a pattern of magnetic dots in the lower-order bits of an address part in a servo pattern area shown in FIG. 1B.

FIG. 1D is a cross-sectional view showing the magnetic dots 41 in the lower-order bits LB of the servo pattern area S shown in FIG. 1B by partially enlarging the magnetic dots 41. The magnetic dots 41 of the servo pattern area S are formed on the disk substrate 40, and are all magnetized in advance in the same direction in the same plane by an external magnetic field at the time of manufacture of the magnetic disk 4. Arrows shown in each magnetic dot 41 of FIG. 1D indicate directions of magnetization in the magnetic dots 41. Further, when directions of magnetization of all the magnetic dots 41 in the same plane are the same, magnetic fluxes strike against each other to thereby make the bit magnetization unstable. However, when the dot area is small, even a single magnetic domain is magnetically stable by virtue of the high coercive force (Hc), and the directions of magnetization of the magnetic dots 41 do not change during an operation of the magnetic disk device 9 when the magnetic disk 4 is in the normal state.

FIG. 1C is a cross-sectional view showing the magnetic dots 41 in the higher-order bits UB of the servo pattern area S in the conventional example shown in FIG. 1B by partially enlarging the magnetic dots 41, and arrows shown in each magnetic dot 41 indicate directions of magnetization of the magnetic dot 41. In the higher-order bits UB, the dot area is large as described previously, further the coercive force (Hc) lowers in the record single-domain film to thereby make the state magnetically unstable, and hence part of the magnetic dots 41 are liable to cause magnetization inversion. FIG. 1C shows a state where part of the magnetic dots 41 have caused magnetization inversion. The magnetic dot 41 magnetization of which has been inverted is marked with dots.

In the magnetic dots 41 in the higher-order bits UB, the magnetization becomes unstable by heat fluctuation, and the coercive force of the magnetic dot is weakened in some cases. Further, in the pattern of the magnetic dots 41 of the servo pattern area S in the conventional example, there has been a problem that when part of the magnetic dots 41 of the higher-order bits UB of the servo pattern area S cause magnetic inversion or the coercive force of the magnetic dots is weakened, the positioning accuracy of the head on the track is deteriorated.

This embodiment is intended to prevent magnetization inversion of the magnetic dots 41 in the higher-order bits UB from occurring, and maintain the positioning accuracy of the head on the track at a high degree of quality. For that purpose, in this embodiment, the arrangement pattern of the magnetic dots in the address part of the servo pattern area of the bit-patterned medium is arranged in such a manner that magnetic dots are dispersed in the servo pattern area in a state where the dot area is small in order that magnetization inversion may not occur.

Figure 2A:
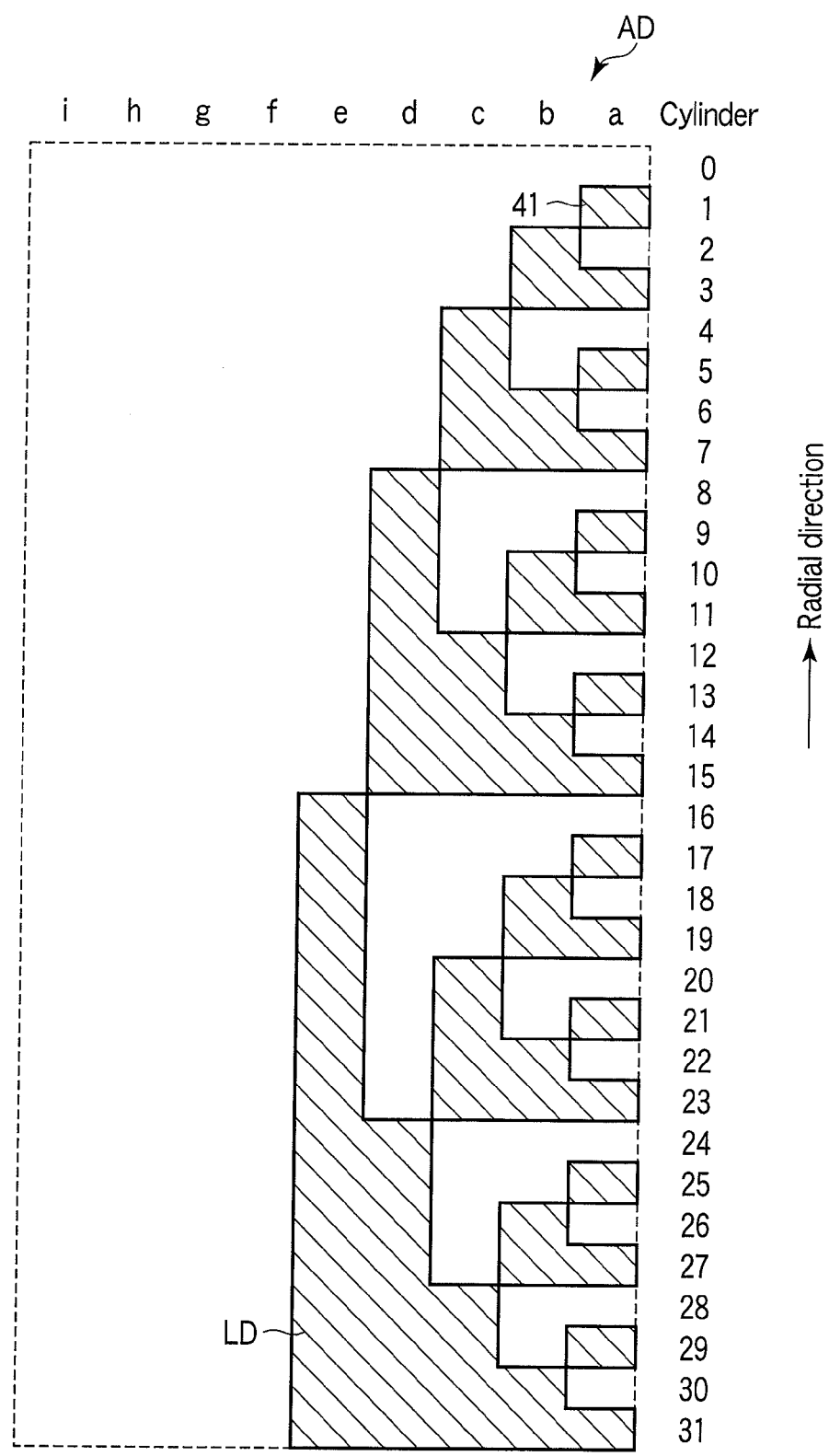
FIG. 2A is a partially enlarged plan view showing an example of a dot pattern where an address part of a servo pattern area is of a 9-bit configuration.

Here, in order to intelligibly explain the arrangement pattern of the magnetic dots in the address part of the servo pattern area of this embodiment, first, the case where the servo pattern formed by the magnetic dots of the address part is of the 9-bit configuration provided with bits a to i as shown in FIG. 2A, and the number of cylinders (number of tracks) is 32 including cylinders 0 to 31 will be described.

FIG. 2A shows the address part AD on which data values 0 to 31 are recorded in sequence in the conventional arrangement as servo information in the servo pattern area of the magnetic disk by partially enlarging the address part AD. In FIG. 2A, the hatched part shows a part in which magnetic dots 41 are present. Further, it is assumed that the magnetic dots 41 are magnetized, and information "1" is recorded thereon, and the part in which no magnetic dot is present is read as "0" at the time of reproduction. Accordingly, no magnetic dot 41 is present in the cylinder 0, and hence the value of data expressed by the cylinder 0 is 0. A series of 4 magnetic dots 41 is present in the cylinder 31, and hence the value of data shown by the cylinder 31 is 31.

Figure 2B:
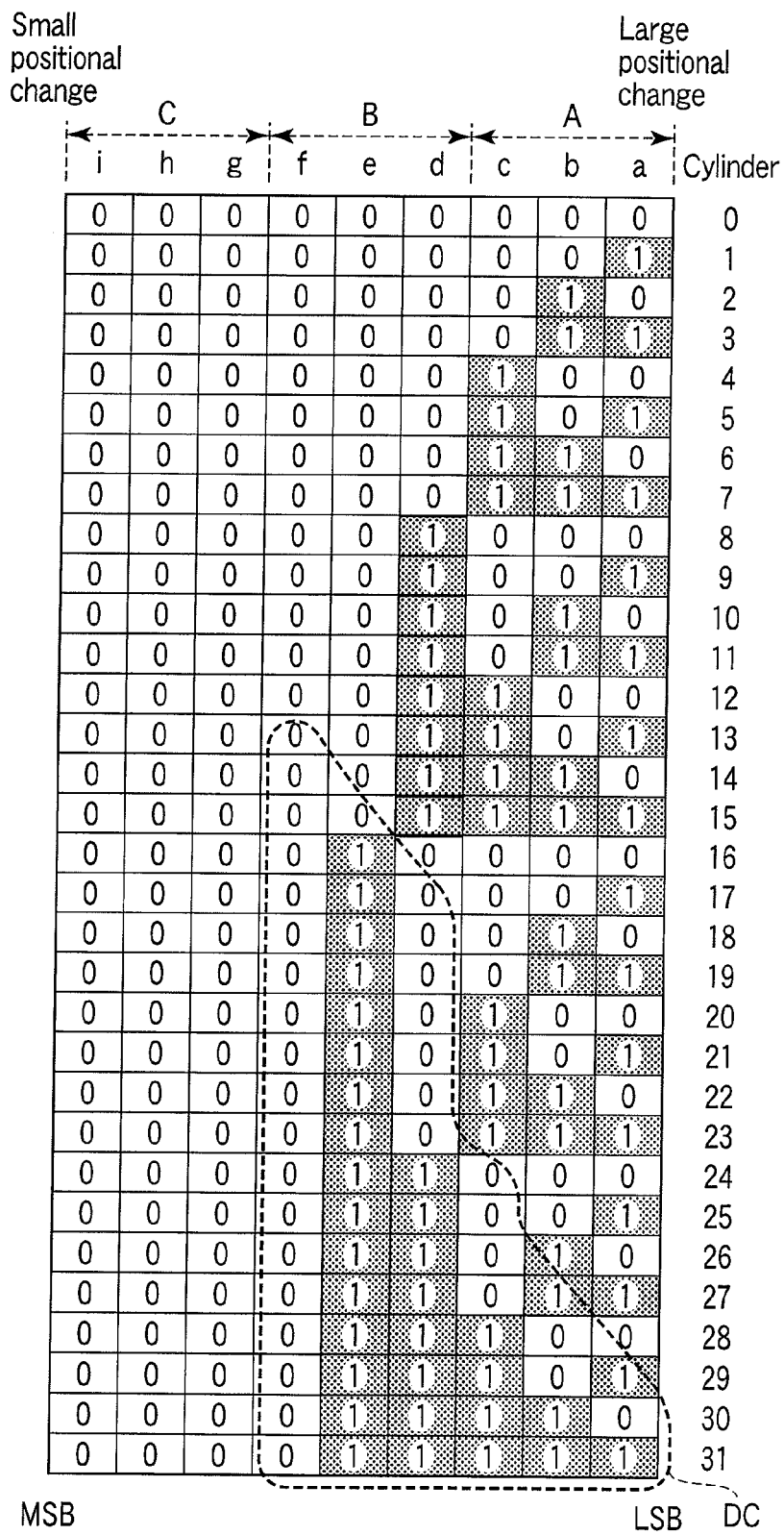
FIG. 2B is a view showing a bit map for 9 bits/32 cylinders showing the data contents of a dot pattern shown in FIG. 2A.

FIG. 2B is formed by converting the data contents of the pattern formed by the magnetic dots 41 shown in FIG. 2A into a bit map. The lateral direction of the bit map expresses the bit a (right end) to bit i (left end), and longitudinal direction expresses the cylinder 0 (upper end) to cylinder 31 (lower end). Accordingly, when the pattern of the magnetic dots 41 is read in sequence by the head, it is sufficient to consider that a bit map shown in FIG. 2B including addresses a to i in the X direction, and addresses 0 to 31 in the Y direction is stored in the memory in the controller 10. Here, for the sake of simplification of the description, the numbers 0 to 31 of the cylinders, and demodulated values 0 to 31 of the cylinders are made identical with each other. That is, it is assumed that for example, when the data of the cylinder 7 is demodulated, the demodulated value becomes 7.

On the other hand, when the magnetic dots 41 are arranged as shown in FIG. 2A, an aggregated part LD of the magnetic dots 41 with a large area is present at a part indicated by addresses a to e, and cylinders 16 to 31. This aggregated part LD of the magnetic dots 41 includes long parts in both the radial direction of the disk, and circumferential direction thereof, and hence, in the aggregated part LD, the coercive force Hc is small, and the magnetization is easily inverted. Accordingly, data "1" in the aggregated part DC of "1" encircled by a broken line in FIG. 2B is liable to be inverted to data "0". In order to solve this problem, it is sufficient if the data on the bit map shown in FIG. 2B is dispersed (coded) in advance on the map according to a certain rule, the dispersed data is read, and thereafter the read data is restored to the original data (decoded) on the basis of the above-mentioned rule. That is, it is sufficient if, on the bit map having addresses a to i in the X direction, and addresses 0 to 31 in the Y direction, data "1" are dispersed according to a certain rule, and then magnetic dots 41 are formed on the address part of the servo area based on the dispersed data. Further, it is sufficient if the demodulation is carried out according to the above-mentioned rule in such a manner that, when the pattern of the magnetic dots 41 dispersed and arranged on the address part is read by the head, the read data coincides with the data obtained by reading the pattern of the magnetic dots 41 shown in FIG. 2A by means of the head.

The method of this embodiment for dispersing the data "1" on the bit map shown in FIG. 2B on the bit map having addresses a to i in the X direction, and addresses 0 to 31 in the Y direction according to a certain rule will be described below on the basis of some examples by using FIGS. 3 to 11B.

FIG. 3 is an explanatory view showing the bit map for 9 bits/32 cylinders shown in FIG. 2B by dividing the bit map into three groups of first bit map A, second bit map B, and third bit map C for 3 bits/32 cylinders. In the first to third bit maps A to C, values indicated by "1" and "0" are data values (A) to (C). Further, numerals shown on the right side of the data values are demodulated values <A> to <C> obtained by demodulating the data values (A) to (C) in each bit map on the assumption that the first to third bit maps A to C are independent bit maps. Hereinafter, the demodulated values of each group will be referred to as intra-group demodulated values <A> to <C>. The data of the address d of the cylinder 31 in the second bit map B is "1", data of the address e is "1", and data of the address f is "0", and hence the intra-group demodulated value <B> of the cylinder 31 of the second bit map B becomes 3 (0×(second power of 2)+1×(first power of 2)+1×(0th power of 2)=3). Further, when 9 bits are divided into three groups each of which is constituted of 3, each group becomes an octal number, and hence the demodulated value of the overall cylinder is expressed as follows.

[intra-group demodulated value <C>×(second power of 8)+intra-group demodulated value <B>×(first power of 8)+intra-group demodulated value <A>×(0th power of 8)]

For example, the demodulated value of the cylinder 31 becomes 31 ((0×1)+(3×8)+(7×1)=31). In the description after this, the intra-group demodulated values <A> to <C> of FIG. 3 will be referred to as original intra-group demodulated values <A> to <C>.

Figure 4:
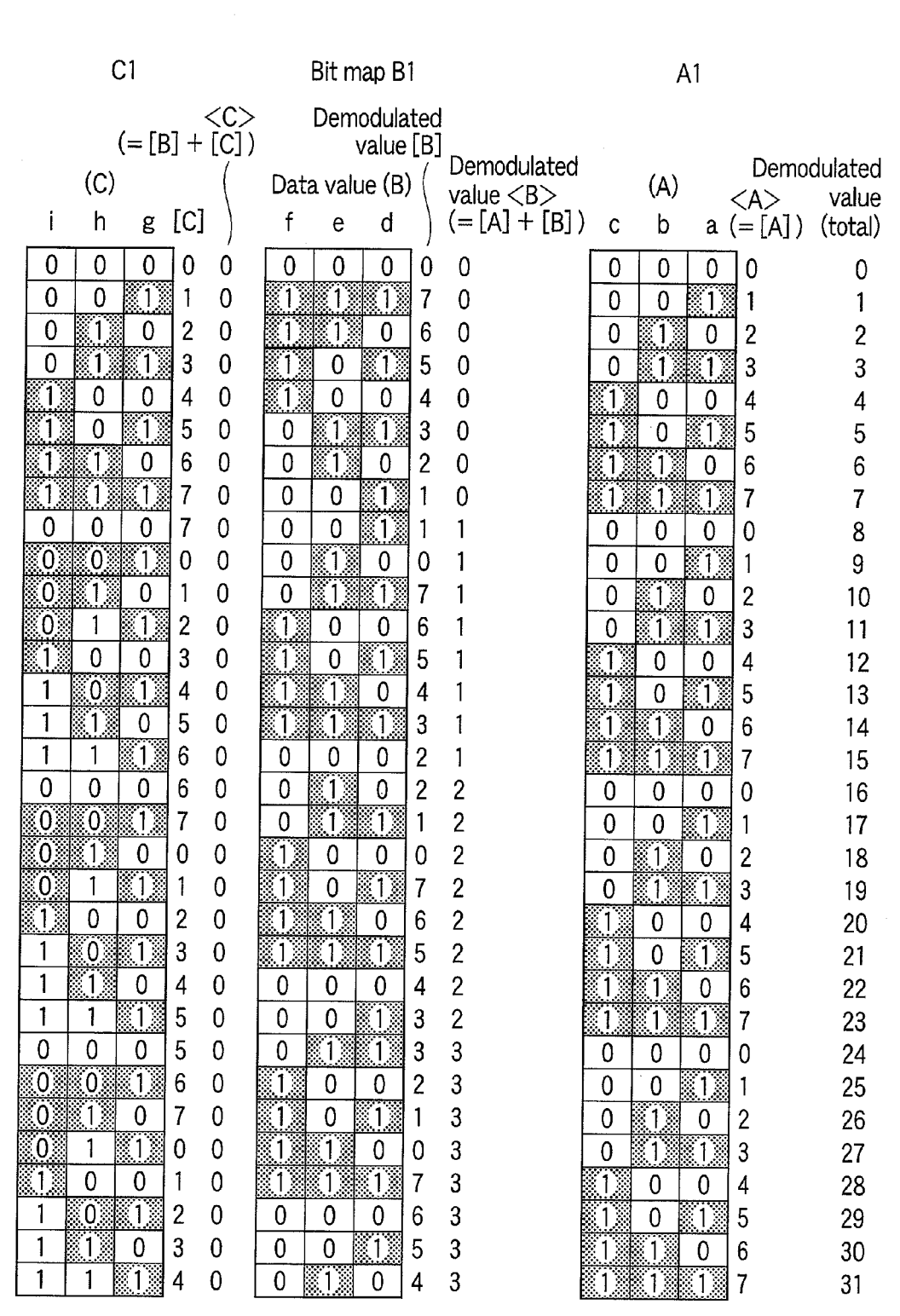

FIG. 4 shows three bit maps of first, second, and third maps A1 to C1 of the first example. In FIG. 4, new intra-group demodulated values of data values (A) to (C) indicated by "1" and "0" in the bit maps A1 to C1 are indicated by [A] to [C]. Furthermore, the original intra-group demodulated values required in the bit maps A1 to C1 are indicated by <A> to <C>.

The first bit map A1 is made identical with the first bit map A shown in FIG. 3. Accordingly, in the first bit map A1, the original intra-group demodulated value <A> is identical with the new intra-group demodulated value [A], and this also apples to the data value (A). Then, the second bit map B1 is made according to a certain rule in the following manner on the basis of the first bit map A1 shown in FIG. 4. That is, a new intra-group demodulated value [B] of the second bit map B1 is made in such a manner that a value obtained by adding the new intra-group demodulated value [B] of the second bit map B1 to the new intra-group demodulated value [A] of the first bit map A1 becomes the original intra-group demodulated value <B> of the second bit map B1. That is, a new intra-group demodulated value [B] of the second bit map B1 is made to satisfy the formula of <B>=[A]+[B]. When the new intra-group demodulated value [B] can be made, the data value (B) can also be made.

After the new intra-group demodulated value [B] of the second bit map B1, and data value (B) are obtained in the manner described above, the third bit map C1 is made. The third bit map C1 is made according to a certain rule in the following manner on the basis of the second bit map B1 made as shown in FIG. 4. That is, a new intra-group demodulated value [C] of the third bit map C1 is made in such a manner that a value obtained by adding the new intra-group demodulated value [C] of the third bit map C1 to the new intra-group demodulated value [B] of the second bit map B1 becomes the original intra-group demodulated value <C> of the third bit map C1. In other words, a new intra-group demodulated value [C] of the third bit map C1 is made to satisfy the formula of <C>=[B]+[C]. When the new intra-group demodulated value [C] can be made, the data value (C) can also be made.

Figure 5B:
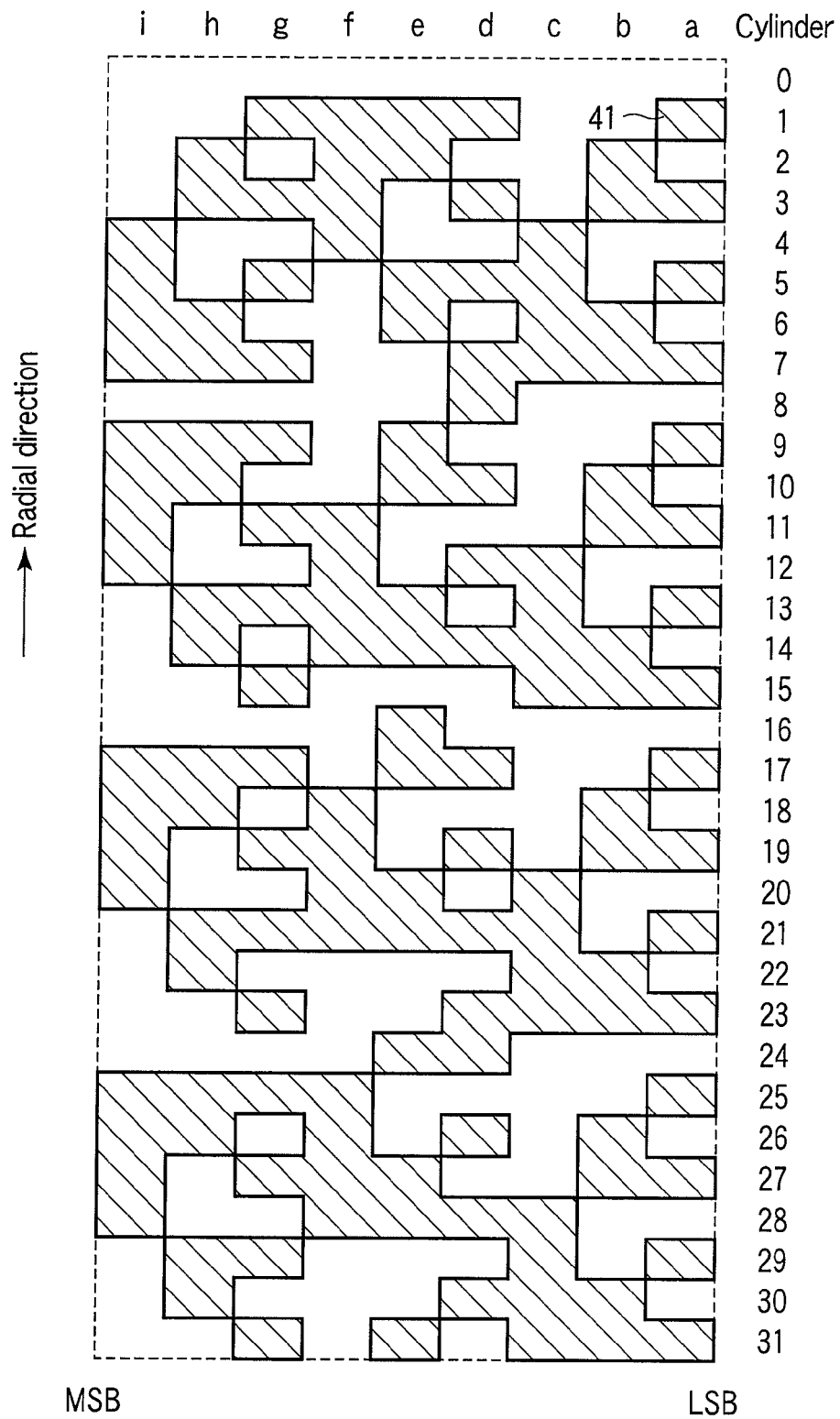
FIG. 5B is a partially enlarged plan view showing a dot pattern of 9-bit configuration formed in the address part of the servo pattern area on the basis of the bit map shown in FIG. 5A.

FIG. 5A shows a bit map for 9 bits/32 cylinders formed by putting the first, second, and third bit maps A1, B1, and C1 shown in FIG. 4 together by the above mentioned method. FIG. 5B shows a dot pattern of the 9-bit configuration formed on the address part of the servo pattern area on the basis of the bit map of FIG. 5A. In the first example, all the bits including the higher-order bits are patterned by utilizing the lower-order bits in which arrangement of bits is frequently changed, and hence an aggregated part of many dots 41 cannot be found on the bit map, the coercive force Hc becomes larger, and the resistance against magnetization inversion is improved.

The data shown in FIG. 5A obtained by reading the dots shown in FIG. 5B is demodulated on the basis of the rule described previously, and as the original intra-group demodulated value <A> of the part of the first bit map A1, the new intra-group demodulated value [A] is employed as it is. On the other hand, the original intra-group demodulated value <B> of the second bit map B1 is obtained by adding the new intra-group demodulated value [B] of the second bit map B1 to the new intra-group demodulated value [A] of the first bit map A1. The original intra-group demodulated value <C> of the third bit map C1 is obtained by adding the new intra-group demodulated value [C] of the third bit map C1 to the new intra-group demodulated value [B] of the second bit map B1.

Figure 6:
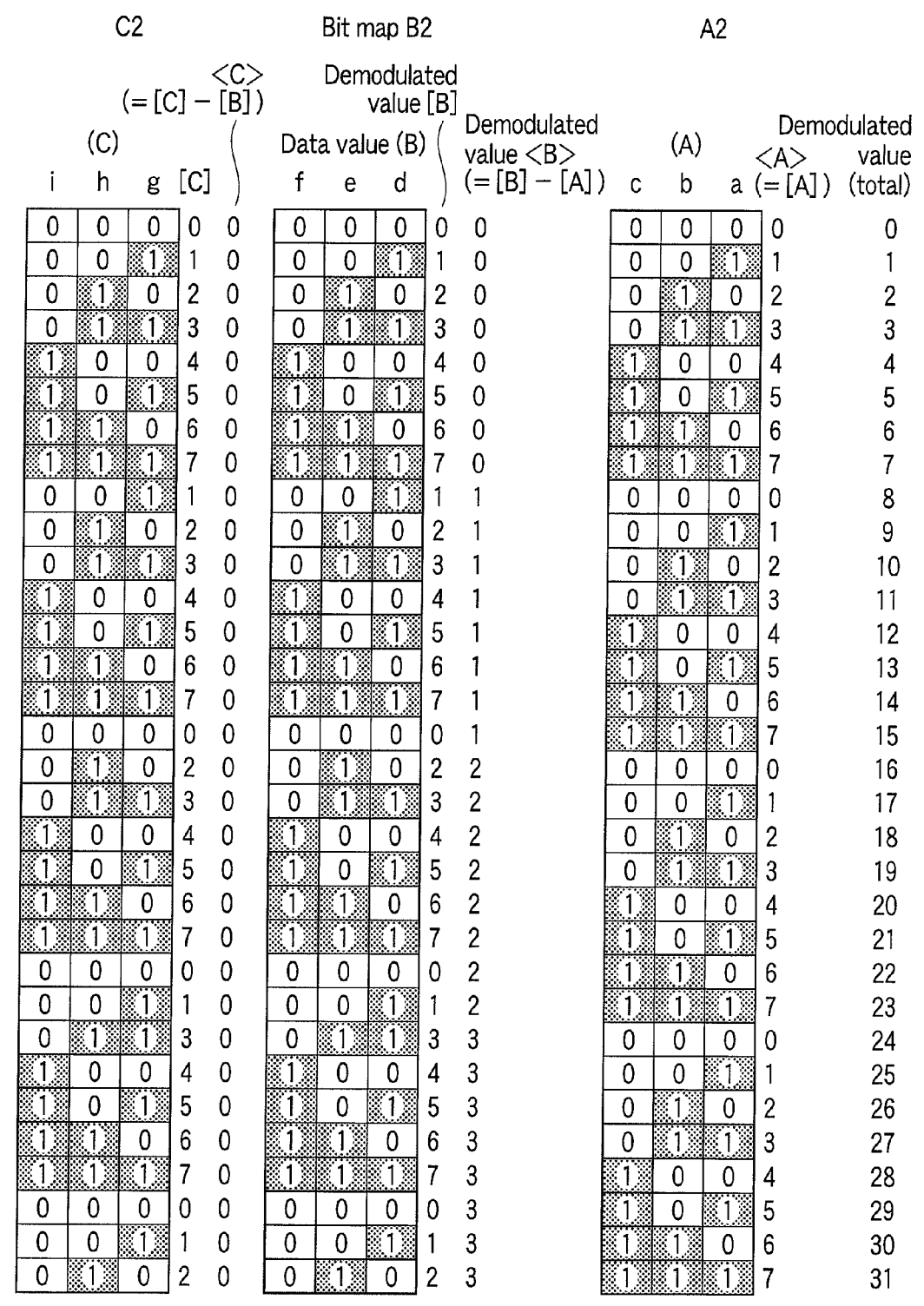

FIG. 6 is a view showing three bit maps of the first, second, and third bit maps A2 to C2 for 3 bits/32 cylinders of the second example. In FIG. 6 too, the new intra-group demodulated values of the data values (A) to (C) indicated by "1" and "0" in the bit maps A2 to C2 are indicated by [A] to [C]. Furthermore, the original intra-group demodulated values required in the bit maps A2 to C2 are indicated by <A> to <C>.

First, the first bit map A2 is made identical with the first bit map A shown in FIG. 3. Accordingly, in the first bit map A2, the new intra-group demodulated value [A] is identical with the original intra-group demodulated value <A>, and this also applies to the data value (A). Then, the second bit map B2 is made according to a certain rule in the following manner on the basis of the first bit map A2 shown in FIG. 6. That is, a new intra-group demodulated value [B] of the second bit map B2 is made in such a manner that a value obtained by subtracting the new intra-group demodulated value [A] of the first bit map A2 from the new intra-group demodulated value [B] of the second bit map B2 becomes the original intra-group demodulated value <B> of the second bit map B2. That is, a new intra-group demodulated value [B] of the second bit map B2 is made to satisfy the formula of <B>=[B]−[A]. When the new intra-group demodulated value [B] can be made, the data value (B) can also be made.

After the new intra-group demodulated value [B] of the second bit map B2, and data value (B) are obtained in the manner described above, the third bit map C2 is made. The third bit map C2 is made according to a certain rule in the following manner on the basis of the second bit map B2 made as shown in FIG. 6. That is, a new intra-group demodulated value [C] of the third bit map C2 is made in such a manner that a value obtained by subtracting the new intra-group demodulated value [B] of the second bit map B2 from the new intra-group demodulated value [C] of the third bit map C2 becomes the original intra-group demodulated value <C> of the third bit map C2. In other words, a new intra-group demodulated value [C] of the third bit map C2 is made to satisfy the formula of <C>=[C]−[B]. When the new intra-group demodulated value [C] can be made, the data value (C) can also be made.

FIG. 7 shows a bit map for 9 bits/32 cylinders formed by putting the first, second, and third bit maps A2, B2, and C2 shown in FIG. 6 together by the above-mentioned method. Illustration of a dot pattern of the 9-bit configuration formed on the address part of the servo pattern area on the basis of the bit map of FIG. 7 is omitted. In the second example too, all the bits including the higher-order bits are patterned by utilizing the lower-order bits in which arrangement of bits is frequently changed, and hence an aggregated part of many dots 41 cannot be found on the bit map, the coercive force Hc becomes larger, and the resistance against magnetization inversion is improved.

The data shown in FIG. 7 is also demodulated on the basis the rule described previously, and as the original intra-group demodulated value <A> of the part of the first bit map A, the new intra-group demodulated value [A] is employed as it is. On the other hand, the original intra-group demodulated value <B> of the second bit map B2 is obtained by subtracting the new intra-group demodulated value [A] of the first bit map A2 from the new intra-group demodulated value [B] of the second bit map B2. The original intra-group demodulated value <C> of the third bit map C2 is obtained by subtracting the new intra-group demodulated value [B] of the second bit map B2 from the new intra-group demodulated value [C] of the third bit map C2.

Next, although a third example of this embodiment will be described below, the third example differs from the first and second examples in the way of dispersing data on the bit map. In the third example, as shown in FIG. 8A, the bit map of FIG. 2B for 32 cylinders is divided into three bit maps of first, second, and third bit maps A, B, and C, and is further divided in the cylinder direction into four groups of P, Q, R, and T each of which is constituted of 8 cylinders. As a result of this, the bit map for 9 bits/32 cylinders is divided into 12 segments each of which is provided with data for 3 bits/8 cylinders. The 12 segments include, as shown in FIG. 8A, segments AP, BP, CP, AQ, BQ, CQ, AR, BR, CR, AT, BT, and CT.

Figure 8B:
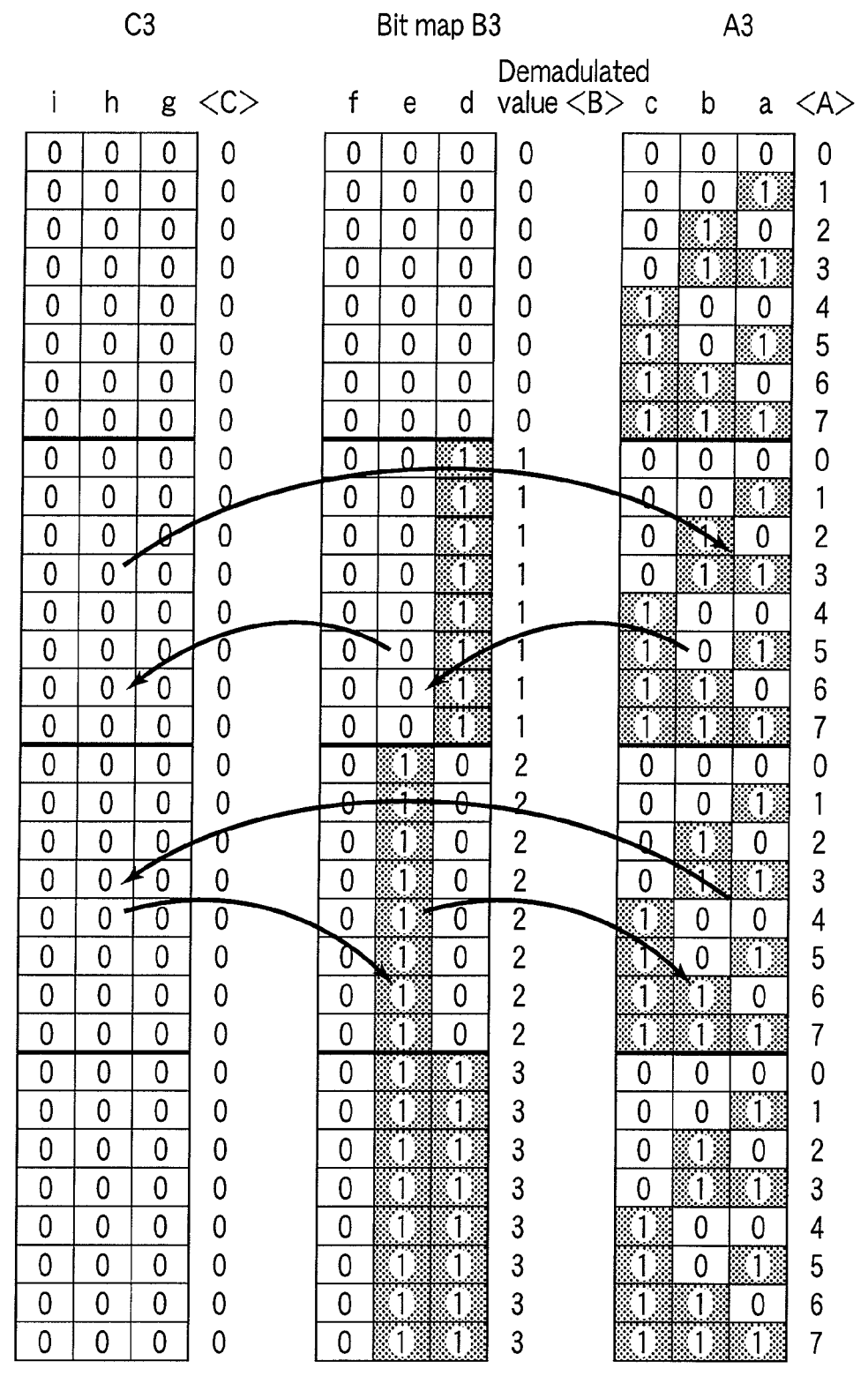

In the third example, as shown in FIG. 8B, although the segments AP, BP, and CP in the group P, and segments AT, BT, and CT in the group T are kept as they are, the segments AQ, BQ, CQ in the group Q, and segments AR, BR, and CR in the group R are transposed in the same group. In the third example, for example, in the group Q, the segment AQ is moved to the position of the segment BQ, segment BQ is moved to the position of segment CQ, and segment CQ is moved to the position of segment AQ. In the group R, the segment AR is moved to the position of the segment CR, segment BR is moved to the position of segment AR, and segment CR is moved to the position of segment BQ.

Figure 9A:
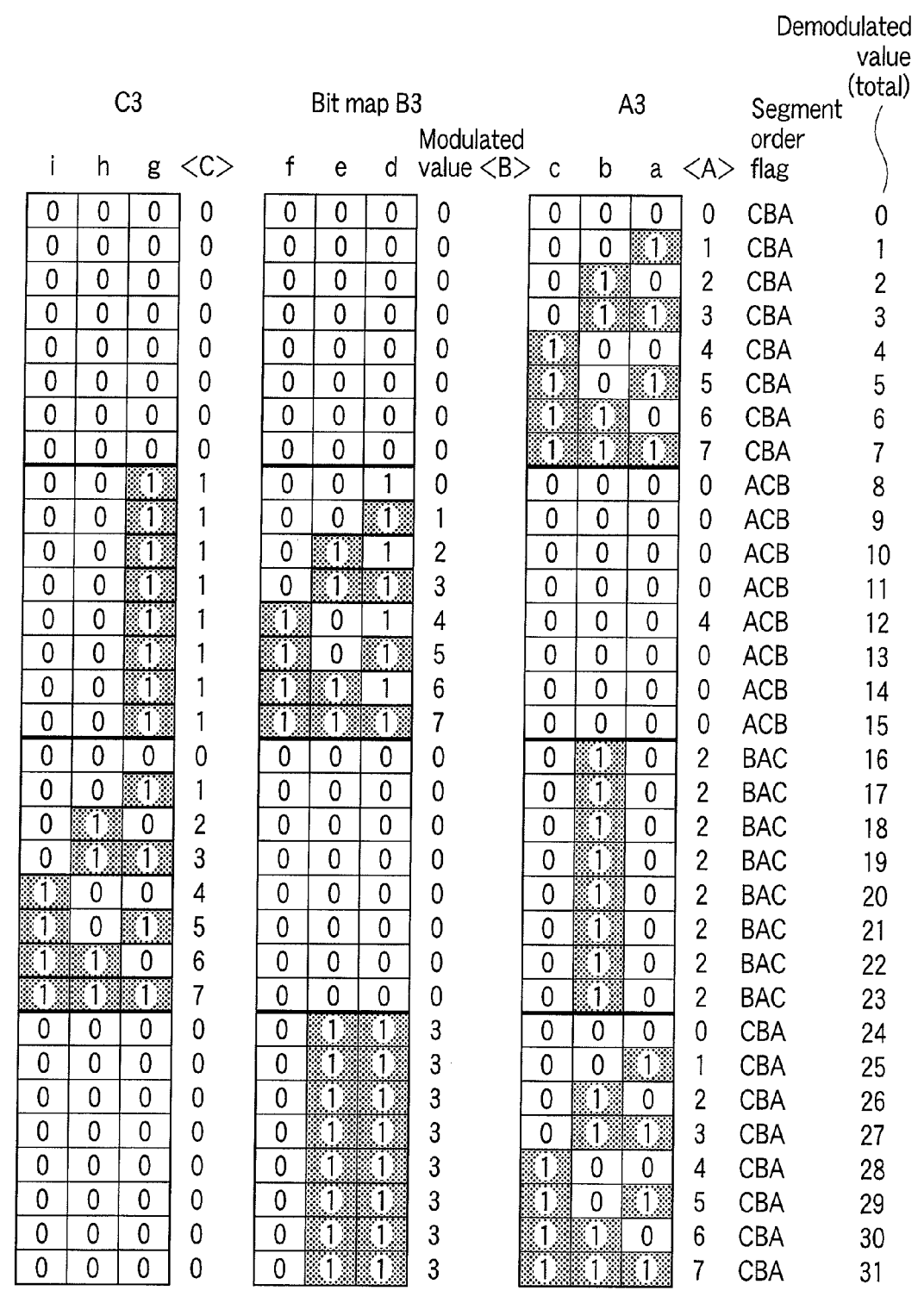

FIG. 9A shows the three bit maps of the first, second, and third bitmaps A3, B3, and C3 made by the method of the third example described previously, and FIG. 9B shows a bit map for 9 bits/32 cylinders formed by putting the three bit maps of the first, second, and third bit maps A3, B3, and C3 shown in FIG. 9A together. As described above, by the method of the third example too, a large aggregated part of dots 41 cannot be found on the formed bit map, the coercive force Hc becomes larger, and the resistance against magnetization inversion is improved.

In the data shown in FIG. 9B, in the segments AP, BP, and CP in the group P, and segments AT, BT, and CT in the group T, data is demodulated as it is. Further, in the segments AQ, BQ, and CQ in the group Q, and segments AR, BR, and CR in the group R, data items are replaced in the same group. Thus, regarding the segments AQ, BQ, and CQ in the group Q, and segments AR, BR, and CR in the group R, the order of data items in the segment units is changed according to the replacement rule. It is sufficient if the order of the data items in the segment units is stored at any position of the bit map as a segment order flag.

FIG. 10A shows a relationship between the segment order flag and cylinder value information (information on the above-mentioned segment order) which are to be added to the address part of the servo pattern area when the third example of this embodiment is implemented. In the segment order flag, the readout order of the segments in the group is described, and hence, by demodulating the read data of each segment according to the readout order, the original data can be obtained.

When the segments shown in FIG. 9B are laid out on the magnetic disk as bits, it is possible to set redundant intervals between the segments. Then, when there are no redundant intervals between the segments, in the magnetic dots in which the directions of magnetization are identical with each other, fluxes strike against each other as shown in FIG. 10B. On the other hand, when a redundant interval is set between the segments, in the magnetic dots in which the directions of magnetization are identical with each other as shown in FIG. 10C, at a part in which a redundant interval is set between segments, the fluxes at the dots between which the redundant interval is held are weakened, the influence of the magnetic field is made small, and the possibility of magnetization inversion is lessened.

FIG. 10D shows a relationship between the segment order flag and cylinder value information in a case where the position of the segment order flag shown in FIG. 10A is changed. As described above, the position of the segment order flag may be arranged in front of or behind the cylinder value information or may be arranged between the cylinder information items. Furthermore, FIG. 10E shows an example of a case where additional information is added, in addition to the segment order flag, to the address part of the servo pattern area shown in FIG. 10A. The additional information implies information other than the servo information and address information.

In the third example which has been described above, although the segments are moved only in each group, movement of the segments is not limited within the group if only the movement destinations of the segments are made clear, and any segments may be replaced with each other.

Figure 11A:
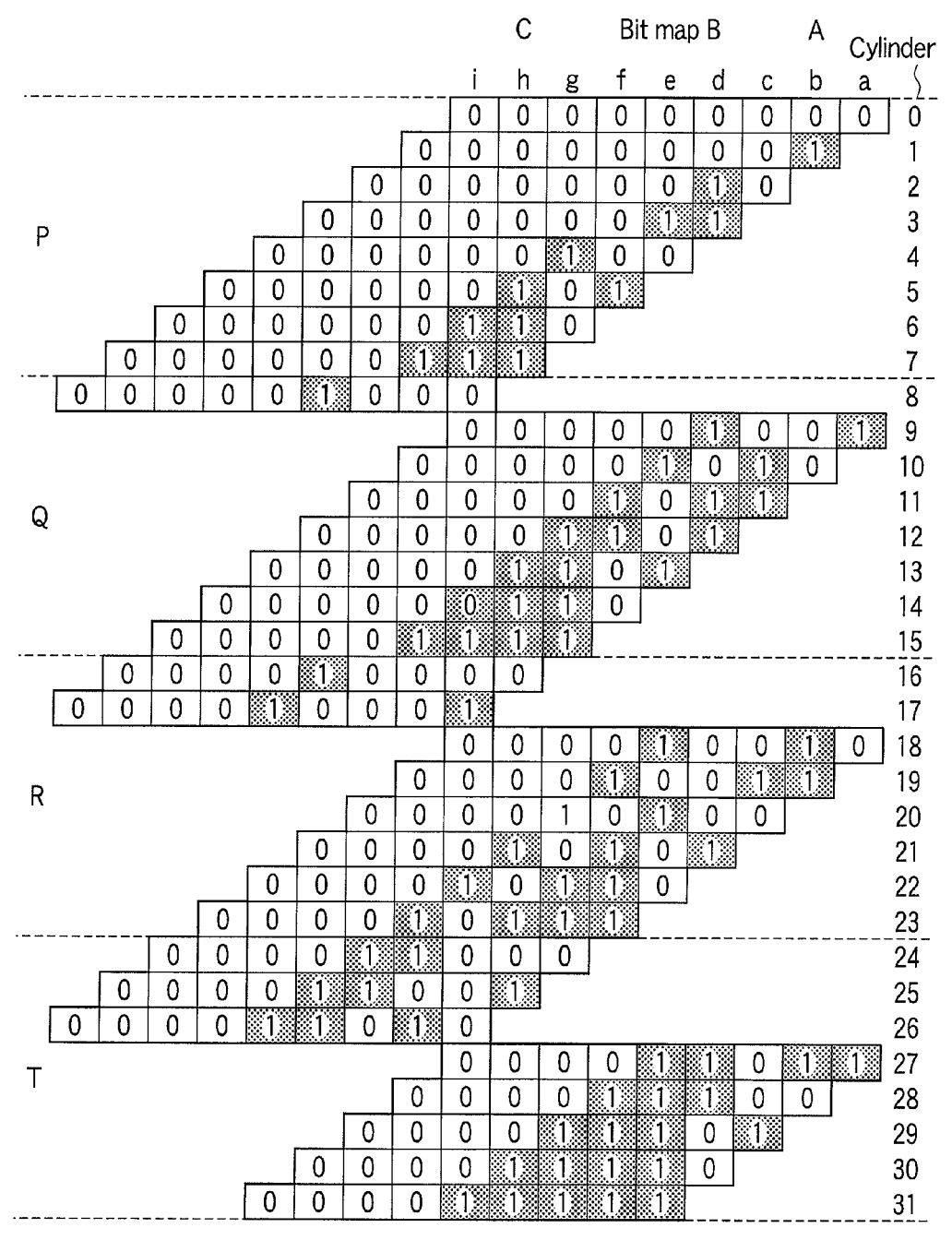

FIG. 11A shows a fourth example of this embodiment. In the third example, as described in connection with FIG. 8A, the bit maps are further divided in the cylinder direction into four groups of P, Q, R, and T to form 12 segments, and the segments are moved in each group to disperse the data. On the other hand, in the fourth example, as shown in FIG. 11A, the bit map is divided in the cylinder direction into four groups of P, Q, R, and T each of which is constituted of 8 cylinders, further bits are shifted in the cylinders in each group, and the number of shift is increased by 1 as the number of cylinders becomes larger. Further, data of the part extending off the bit map is returned to an empty area in the bit map, whereby a bit map shown in FIG. 11B is formed. By this example too, it is possible to disperse, on the bit map, an aggregated part of large data on the bit map.

As a modification example of the fourth example described above, the amount of shift of the bits in the four groups of P, Q, R, and T may be randomized. Furthermore, the amount of shift of the bits in each cylinder may be randomized without dividing the bit map into groups. However, the amount of shift of the bits in each cylinder in the bit map is determined in advance according to a rule, and the data read from the servo pattern area in which data bits are dispersedly arranged on the servo pattern must be able to be demodulated to the original servo data according to the rule. It is sufficient if the demodulation of such data read from the servo pattern part is carried out by the controller 10 shown in FIG. 1A.

According to the patterned medium of the embodiment, and information storage device incorporating the patterned medium, even in the case where a length of data to be recorded on the servo pattern area is large and data items "1" are concentrated at the higher-order bits, by dispersing the patterns of the servo pattern area of the disk on the basis of a predetermined rule, data items "1" are prevented from being concentrated at the higher-order bits, and the upward or downward magnetization state of dots in the servo pattern area is hardly inverted.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. An arrangement method of a servo pattern of a bit-patterned storage medium comprising a servo area and a data area, the method comprising:
    extending an address information on a bit map comprising an abscissa corresponding to a circumferential direction of the storage medium and an ordinate corresponding to a radial direction of the storage medium to generate an original address information;
    dividing the original address information into groups, each group extending along the ordinate;
    obtaining demodulated values of the original address information for each group as original intra-group demodulated values;
    setting, with respect to a lowest order group, the original address information as new address information and the original intra-group demodulated value as a new intra-group demodulated value;
    obtaining a new address information of a first group so that an original intra-group demodulated value of the first group comprises a new intra-group demodulated value of a group lower by one order and a new intra-group demodulated value based on the new address information; and
    determining an arrangement pattern of bits in the servo area based on the new address information.

2. The method of claim 1, wherein the operation comprises an addition operation and a subtraction operation.

3. An information storage device comprising:
    a bit-patterned storage medium comprising a servo pattern arranged by the method of claim 1;
    an actuator configured to hold a magnetic head to access the storage medium, and to move the magnetic head in the radial direction; and
    a demodulation circuit configured to demodulate a signal of the servo pattern read by the magnetic head based on a servo pattern arrangement rule.

4. An arrangement method of a servo pattern of a bit-patterned storage medium comprising a servo area and a data area, the method comprising:
    extending an address information to be recorded on an address part of the servo area on a bit map comprising an abscissa corresponding to a circumferential direction of a storage medium and an ordinate corresponding to a radial direction of the storage medium to generate an original address information;
    dividing the original address information with respect to directions of the abscissa and the ordinate to form segments each of which comprises a same number of address information items;
    moving positions of the segments on the bit map to form a new address information on the bit map; and
    determining an arrangement pattern of bits in the servo area based on the new address information.

5. The method of claim 4, wherein the moving comprises moving the positions of the segments within segments comprising a same longitudinal position.

6. The method of claim 4, wherein movement information on the positions of the segments is located adjacent to the servo pattern in a patterned form.

7. The method of claim 4, wherein movement information on the positions of the segments is located between the segments in a patterned form.

8. The method of claim 4, wherein another type of servo information is located between the segments in a patterned form.

9. The method of claim 4, wherein a redundant interval with no bit is located between the segments.

10. An information storage device comprising:
    a bit-patterned storage medium comprising a servo pattern arranged by the method of claim 4;
    an actuator configured to hold a magnetic head to access the storage medium, and to move the magnetic head in the radial direction; and
    a demodulation circuit configured to demodulate a signal of the servo pattern read by the magnetic head based on a servo pattern arrangement rule.

11. An arrangement method of a servo pattern of a bit-patterned storage medium comprising a servo area and a data area, the method comprising:
    extending an address information to be recorded on an address part of the servo area on a bit map comprising an abscissa corresponding to a circumferential direction of a storage medium and an ordinate corresponding to a radial direction of the storage medium to generate an original address information corresponding to each cylinder;
    replacing the original address information to form a new address information on the bit map, by:
        shifting the original address information toward a higher order by one bit from a lowest cylinder number;
        moving the address information displaced from the bit map by the shift to an address emptied by the shifting; and
        repeating the shifting in order to form a new bit map; and
    determining an arrangement pattern of bits in the servo area based on the new address information.

12. An information storage device comprising:
a bit-patterned storage medium comprising a servo pattern arranged by the method of claim 11;
an actuator configured to hold a magnetic head to access the storage medium, and to move the magnetic head in the radial direction; and
a demodulation circuit configured to demodulate a signal of the servo pattern read by the magnetic head based on a servo pattern arrangement rule.

* * * * *